United States Patent
Karpisek

(12) 
(10) Patent No.: US 6,186,726 B1
(45) Date of Patent: Feb. 13, 2001

(54) METHOD AND APPARATUS TO CONVERT AN OPEN TOPPED CONTAINER INTO A TOP DISCHARGING CONTAINER

(76) Inventor: Ladislav Stephan Karpisek, 86 Woodfield Boulevarde, Caringbah, New South Wales 2229 (AU)

( * ) Notice: Under 35 U.S.C. 154(b), the term of this patent shall be extended for 0 days.

(21) Appl. No.: 09/194,447
(22) PCT Filed: May 20, 1997
(86) PCT No.: PCT/AU97/00306
   § 371 Date: Nov. 23, 1998
   § 102(e) Date: Nov. 23, 1998
(87) PCT Pub. No.: WO97/44269
   PCT Pub. Date: Nov. 27, 1997

(30) Foreign Application Priority Data
May 20, 1997 (AU) .................................................. PN9954

(51) Int. Cl.[7] .................................................. B65G 65/23
(52) U.S. Cl. .......................... 414/421; 414/405; 414/810
(58) Field of Search .................... 414/405, 419, 414/421, 758, 766, 810, 816

(56) References Cited

U.S. PATENT DOCUMENTS

| | | | | |
|---|---|---|---|---|
| 2,555,537 | * | 6/1951 | Franing | 414/405 X |
| 3,777,920 | * | 12/1973 | Wiese | 414/421 |
| 4,095,707 | * | 6/1978 | Kowtko | 414/405 |
| 4,295,776 | * | 10/1981 | Payne et al. | 414/405 |
| 4,744,701 | * | 5/1988 | Chasteen | 414/421 X |
| 5,302,073 | * | 4/1994 | Riemersma et al. | 414/421 |
| 5,344,275 | | 9/1994 | Habicht | 414/420 |

FOREIGN PATENT DOCUMENTS

| | | | |
|---|---|---|---|
| 3207437 | 9/1983 | (DE) . | |
| 2484378 | * 12/1981 | (FR) | 414/419 |
| 2702331 | 9/1994 | (FR) . | |
| 2254595 | 10/1992 | (GB) . | |
| 2256635 | 12/1992 | (GB) . | |
| 59-207326 | 11/1984 | (JP) . | |
| 87241504 | 1/1987 | (SU) . | |
| 88269569 | 3/1988 | (SU) . | |

* cited by examiner

Primary Examiner—James W. Keenan
(74) Attorney, Agent, or Firm—Edwin D. Schindler

(57) ABSTRACT

An apparatus and related method are provided for converting an open-topped container into a top-emptying container. The apparatus preferably includes a cover having ground-engaging feet and a discharge opening able to be opened and closed. A coupling device is included on the cover for coupling the cover to the open-topped container. A cradle having an entry side and supports provides lateral and back support for a container-cover assembly when the cradle is inverted, in a controlled manner, by a rotationally inverting device. The cradle further includes openable end members with a spacing apart when closed, so that end movement of the container-cover assembly in the cradle, during inversion of the cradle, will be substantially eliminated.

12 Claims, 2 Drawing Sheets

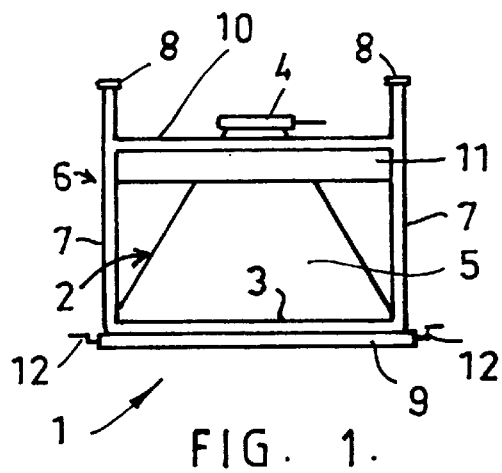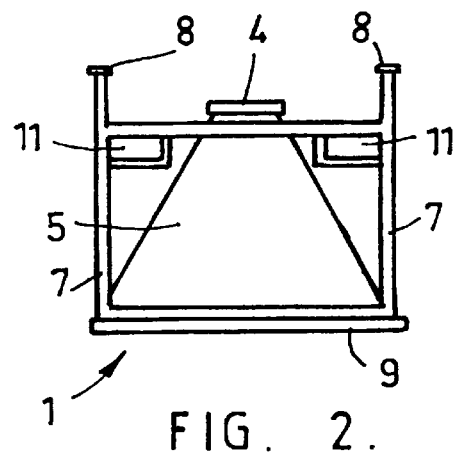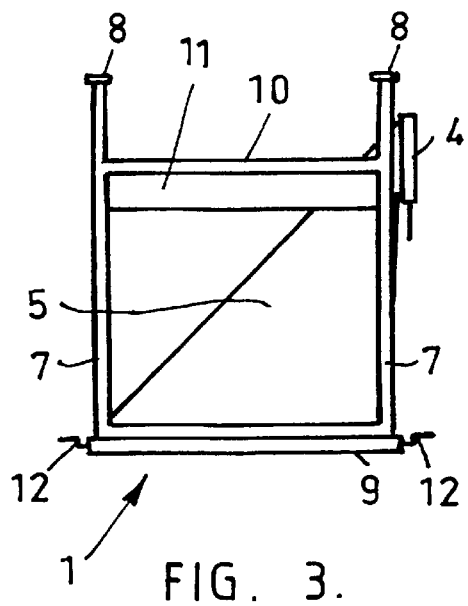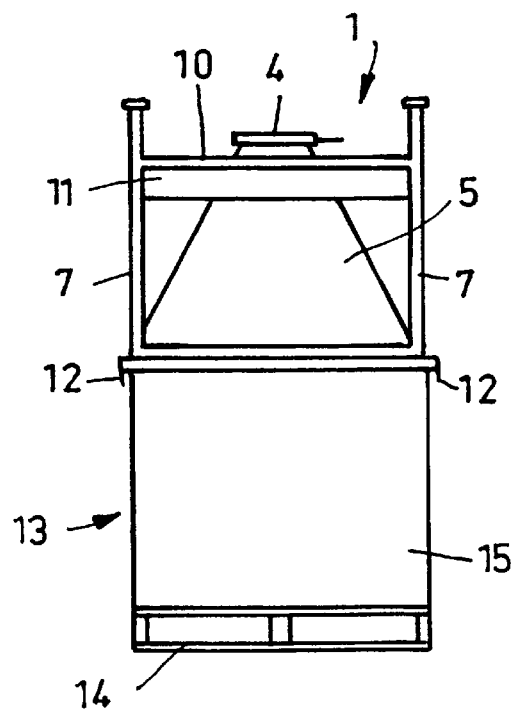

METHOD AND APPARATUS TO CONVERT AN OPEN TOPPED CONTAINER INTO A TOP DISCHARGING CONTAINER

FIELD OF THE INVENTION

This invention is concerned generally with emptying containers and particularly with placing containers is a state of readiness for emptying.

The invention has been devised with containers in mind of the type which comprise a pallet or base with four upstanding interlocked sides. Whilst this the invention has been devised with the above form of container particularly in mind it is not limited to such containers.

BACKGROUND TO THE INVENTION

When containers have to be emptied the methods adopted depend to a large extent on the contents of the container. In the case of flowable non-liquid material, such as granules, gravitational discharge is the preferred option. To facilitate this form of discharge attempts have been made to develop containers which have a bottom discharge means. For a number of reasons containers with a bottom discharge incorporated in a base or pallet forming part of the container has not found favour with users.

An alternative is to tilt the container, usually in a tilting device on which the container is mounted, to the extent required to cause the contents to flow from the container. To provide a generally uniform rate of discharge, which is the normal requirement, the tilt of the container has to be continually adjusted. This discharge method is labour and/or time intensive and is therefore not favoured.

GENERAL DESCRIPTION OF INVENTION

Generally, the present invention provides a container conversion method which involves placing an open topped container in a state or readiness for discharge by the steps of mounting a hood which is provided with a discharge opening over the open top of the container and then inverting the container. Discharge through the discharge opening can be readily regulated by altering the size of the discharge opening. Apparatus for economically and effectively carrying out the method is also disclosed herein.

More specifically the method of the invention, which is for use with an open topped container which includes a base and wall means upstanding from the base, has as its object the conversion of such a container into one which is inverted ready for emptying in a controlled manner through the container top, the method includes the steps of mounting a cover having a discharge opening over the open top of the container, placing the container fitted with the cover in an inverter and inverting the container to reverse the positions of the container base and cover and supporting the inverted container in the inverted condition.

The apparatus to carry out the method includes a cover with a discharge opening and adaption allowing it to be fastened to a container to cover the open end of the container, a container cradle able to be rotationally inverted end over end where the cradle includes a container receiving compartment with means to minimise movement of a container within the compartment during inversion of the cradle.

GENERAL DESCRIPTION OF THE DRAWINGS

In the drawings of preferred embodiments of the apparatus of the invention;

FIG. 1 is a schematic side view of cover for the open top of a container,

FIG. 2 is a schematic end view of the cover of FIG. 1,

FIG. 3 is a schematic side view of a second form of cover,

Figure 5:
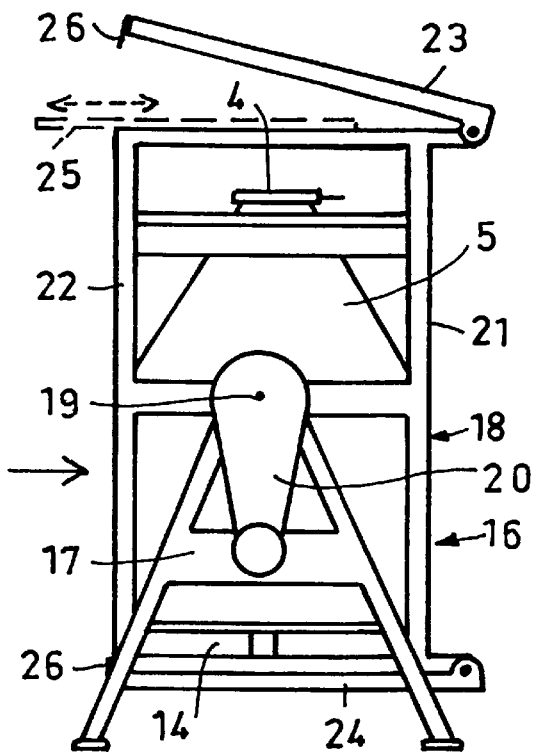
Figure 6:
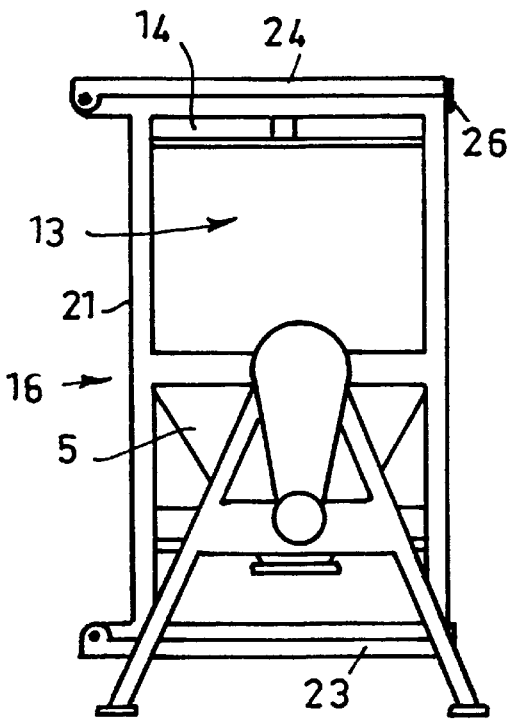
Figure 7:
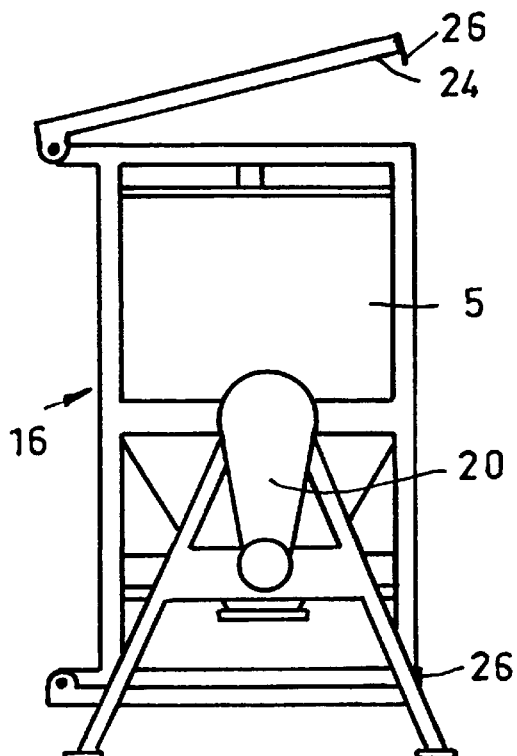
Figure 8:
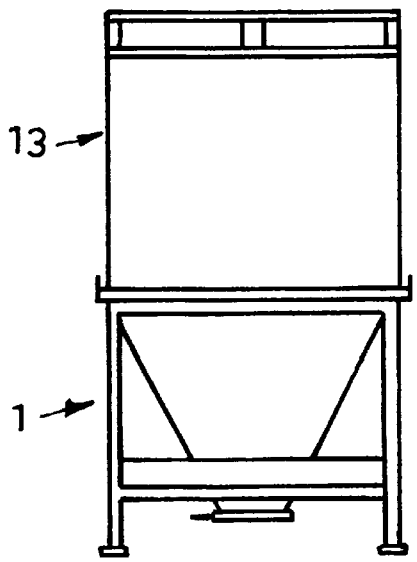

FIG. 4 is a schematic side view of the cover of FIG. 1 mounted over the open top of a container to provide a container-cover assembly, FIG. 5 is a schematic side view of the container-cover assembly of FIG. 4 mounted in an inverter, FIG. 6 is a view similar to FIG. 5 after inversion, FIG. 7 is a view similar to FIG. 6 with an end closure of the inverter opened sufficiently to allow the container-cover assembly to be removed from the inverter and FIG. 8 is a view similar to FIG. 4 showing the container-cover assembly inverted ready for transport to a use location.

DETAILED DESCRIPTION OF THE DRAWINGS

In FIGS. 1 and 2 there is shown a cover 1 which includes a hood 2, of a first form, for mounting over the open top of a container. This form of hood has a receiving end 3 separated from a discharge end provided with a central discharge means 4 by a funnel shaped intermediate part 5. There is a frame 6 around the hood 1. The frame 6 includes legs 7 with feet 8 at first ends of the legs 7 and the other ends of the legs 7 are connected by a mounting ring frame 9. The frame 9 is shaped and sized to sit on the top edges of the sides of a container at the open end thereof and to embrace the sides of the container adjacent the top edges of the container sides. Braces 10 join the legs 7 adjacent the feet 8 and a pair of parallel receivers 11 respectively join pairs of the legs 7. The receivers 11 are shaped and sized to accept the tines of a fork lift truck so allowing the cover to readily raised and positioned on the open top of a container or be removed therefrom.

Clamps indicated 12 are shown diagrammatically as they can be of any suitable type. The clamps 12 allow the frame 9 to be clamped to the top of a container, preferably with a gasket between the container and the frame 9.

FIG. 3 is a hood of the same general configuration as that shown in FIG. 1 except that the funnel part 5 is shaped to provide a side discharge means 4 rather than the centrally located discharge means of FIG. 1. Preferably the discharge means 4 incorporates an adjustable flow control means.

In FIG. 4 a cover 1 has been clamped to a container 13 where the container comprises a pallet base 14 with four sides 15 upstanding from the base 14. The container can be of the type where the sides 15 are demountable from the base 14 and are securable to the base and lockable together in the erect condition to provide an open topped container. The container can also be of the type where the sides 15 are linked to the base 14 allowing the sides 15 to be collapsed onto the base and raised therefrom to the erect condition shown and interlocked to form an open topped container.

In FIG. 5, the container-cover assembly has been mounted in an inverter 16 which includes a cradle support indicated 17 on which there is mounted a cradle 18 so as to be rotatable about an axis indicated 19. There is a drive means indicated 20 whereby the cradle 18 can be rotated though a predetermined arc to invert a container-cover assembly housed in the cradle.

The cradle 18 as shown is a framework generally forming a channel with an open side and open ends. The channel bottom (which forms a cradle back side) is indicated 21 and it is disposed opposite the open cradle side. The spaced apart remaining sides of the channel are indicated 22. The open ends of the cradle 18 are respectively provided with closure members 23 and 24. As illustrated the members 23 and 24 are hinged doors like members and they are provided with lock means of suitable form whereby the members 23–24 can be locked closed over the ends of the cradle. It is to be understood that demountable members 23–24 could be provided as an alternative where the members 23–24 were attachable by quick connection hinge means or members 25 could be slidably mountable over the ends of the cradle.

In preparation for an inversion sequence the closure member 24 of the cradle 18 would be locked closed, as by suitable lock means indicated schematically as 26. The cradle 18 would be positioned in the orientation shown in FIG. 5 by operation of the drive means 20. In a preferred arrangement the drive means would be manually activated and would be deactivated by cradle position detectors associated with the two operative cradle orientations shown in FIGS. 5 and 6.

The container-cover assembly would be placed as shown with the base 14 resting on the closure member 24 and the assembly against the cradle back 18. To facilitate the loading of the assembly the closure member 23 would be at least partially open, as shown. A suitable means may be used to maintain a required opening of the closure member 23. The degree of opening required for loading the assembly can vary. The opening required may be quite small corresponding with a small clearance between the closure member 24 and the bottom of the base pallet 14, as can be achieved by a skilled fork lift truck operator.

The closure member 23 is then locked closed and as the spacing between the closure members 23–24 when locked closed is only marginally greater than the overall height of the container-cover assembly, the assembly will be substantially prevented from end to end movement as the cradle 18 is inverted.

The cradle 18 is then rotated in a clockwise direction to achieve the FIG. 7 condition. The rotation of the cradle is always such that the assembly is supported by the cradle back 18 during inversion.

FIG. 7 illustrates the next operation which is to release the upper closure member 24 (formerly the lower closure member) and open it as required to allow the removal of the container-cover assembly by means of a fork lift truck. The inverted container-cover assembly of FIG. 8 can be transported by the fork lift truck into operational relationship with a machine, or hopper or other use location where discharge from discharge opening 4 can be commenced.

It is to be noted that at no time is the connection between the container and the hood subjected to lifting stresses. To load the hooded container into the inverter (FIG. 4) the lifting is done by engagement of the tines of a fork lift truck with the container base 14. From FIG. 6 it will be seen that by using the receivers 11 for the tines of a fork lift truck the container/hood assembly can be raised and removed from the cradle without any load being applied to the couplings between the hood and the container. The couplings are thus solely involved in the securement of the hood to the container.

The foregoing is a presently preferred form of the invention. It will be understood that the construction described and illustrated could be modified without departing from the inventive concepts herein disclosed.

I claim:

1. A method of converting an open topped container including a base and walls upstanding from the base into a top emptying container when the method includes the steps of providing a cover for the open top of the container wherein said cover includes a discharge means and ground engaging foot means, providing an inverter including a container receiving cradle which is mounted on a cradle support so said cradle can be rotationally inverted end over end and wherein said cradle includes a compartment accessible through a first side of said cradle and also includes spaced apart open ends each fitted with an openable closure member, and the further steps of mounting said cover over the open top of the container, securing the cover to the container to provide a container-cover assembly, positioning said cradle with one of said closure members closed to provide a support on which said base can be placed and with the other of said closure members at least partially open, loading said container-cover assembly into said compartment through said cradle first side and standing said base on said closed closure member, closing said other of said closure members to thereby restrain said container-cover assembly against longitudinal movement between the closed closure members during inversion of said container-cover assembly, rotationally inverting said cradle so said container-closure assembly is inverted and stands on said foot means on said other of said closure members, then at least partially opening said one of said closure members and removing said container-cover assembly from said cradle through said cradle first side.

2. An apparatus for converting an open-topped container into a top-emptying container, comprising:
    a cover with a discharge opening adapted to be opened and closed said cover being capable of being fastened to a container for covering an open end of the container; and,
    a container cradle able to be rotationally inverted end-over-end, said cradle including a container receiving compartment with means for minimizing movement of a container within said container receiving compartment during inversion of said container cradle, said means for minimizing movement within said container receiving compartment in an end-to-end direction includes two openable end closure members for said compartment with a distance between said closure members approximating, but being no less than, the overall height of a container when fitted with said cover.

3. Apparatus as claimed in claim 2, wherein said compartment is accessible through a first side of said cradle and said cradle includes confining means to minimize container movement other than end to end movement within said compartment, where the confining means includes a cradle back located opposite said first cradle side and second and third cradle sides adjacent said cradle back.

4. Apparatus as claimed in claim 3, wherein said cradle is mounted in a cradle support enabling said cradle to be rotated through an arc between container/cover assembly loading and discharge positions which are 180 degrees apart with said container/cover assembly being supported by said cradle back.

5. Apparatus as claimed in claim 4, further comprising driving means to move said cradle relative to said cradle support.

6. Apparatus as claimed in claim 2 wherein said closure members are connected by hinges to said cradle.

7. A method for converting an open-topped container into a top-emptying container, comprising the steps of:
    providing a cover having discharge means and adapted for standing on a support surface;
    placing the cover over an open top of a container;

securing the cover to the container for providing a container-cover assembly which, when inverted, is able to stand alone upon the cover;

providing a cradle having an entry side, lateral supports and a back support opposite the entry side of the cradle, whereby the container-cover assembly is supported during inversion and has openable end members which, when closed, substantially prevent endwise movement of the container-cover assembly during inversion;

providing means for inverting the cradle end-over-end in a controlled manner:

loading the container-cover assembly into the cradle through the entry side of the cradle when one of said openable end members is open;

closing the openable end member of said loading step;

activating said means for inverting the cradle;

opening one of said openable end members; and, removing the so inverted, stand alone, said container-cover assembly from the cradle.

8. An apparatus for converting an open-topped container into a top-emptying container, comprising:

a cover having ground-engaging foot means and a discharge opening able to be opened and closed;

coupling means on said cover for coupling said cover to an open-topped container;

a cradle having an entry side and supports for providing lateral and back support for a container-cover assembly when sail cradle is inverted; and means for rotationally inverting said cradle in a controlled manner, said cradle further including openable end members with a spacing apart when closed, so that end movement of the container-cover assembly in said cradle, during inversion of said cradle, will be substantially eliminated.

9. The apparatus for converting an open-topped container into a top-emptying container according to claim 8, further comprising a cradle support wherein said cradle is permanently mounted in said cradle support for enabling said cradle to be rotationally inverted, with direction of movement of said cradle by said means for rotationally inverting said cradle being constructed so that the container-cover assembly in said cradle will always be back-supported during inversion.

10. The apparatus for converting an open-topped container into a top-emptying container according to claim 8, wherein the openable end members of said cradle are hinged.

11. The apparatus for converting an open-topped container into a top-emptying container according to claim 8, wherein said cover includes a mounting end for connecting said cover to an open end of the open-topped container and a discharge end having said discharge opening, and a funnel-shaped transition element which diminishes in cross-sectional size as it approaches said discharge end.

12. The apparatus for converting an open-topped container into a top-emptying container according to claim 8, wherein said cover includes receivers for engagement by lifting and positioning means, so that said cover is able to be lifted and positioned on an open end of the open-topped container and so that an inverted container-cover assembly is able to be lifted.

* * * * *